E. L. MILLIS.
Corn Sheller.

No. 9,924.

Patented Aug. 9, 1853.

UNITED STATES PATENT OFFICE.

EBEN L. MILLIS, OF ROCHESTER DEPOT, OHIO.

CORN-SHELLER.

Specification of Letters Patent No. 9,924, dated August 9, 1853.

*To all whom it may concern:*

Be it known that I, EBEN L. MILLIS, of Rochester Depot, in the county of Lorain and State of Ohio, have invented certain new and useful Improvements in Corn-Shellers; and I do hereby declare that the following is a full, clear, and exact description of the same, reference being had to the accompanying drawings, making a part thereof, in which—

Figure 1:
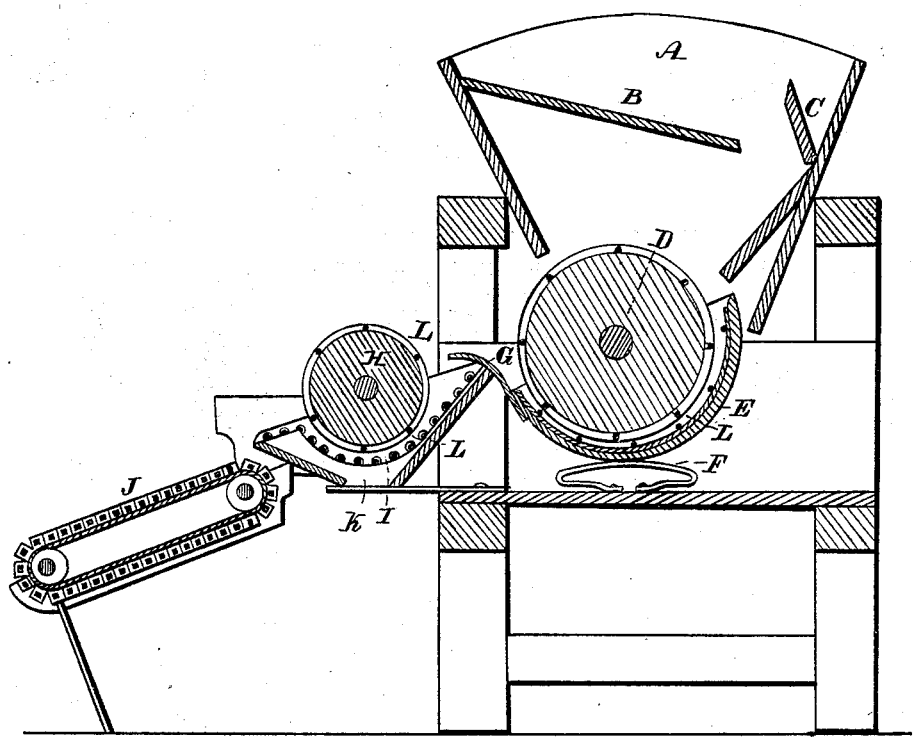
Figure 2:
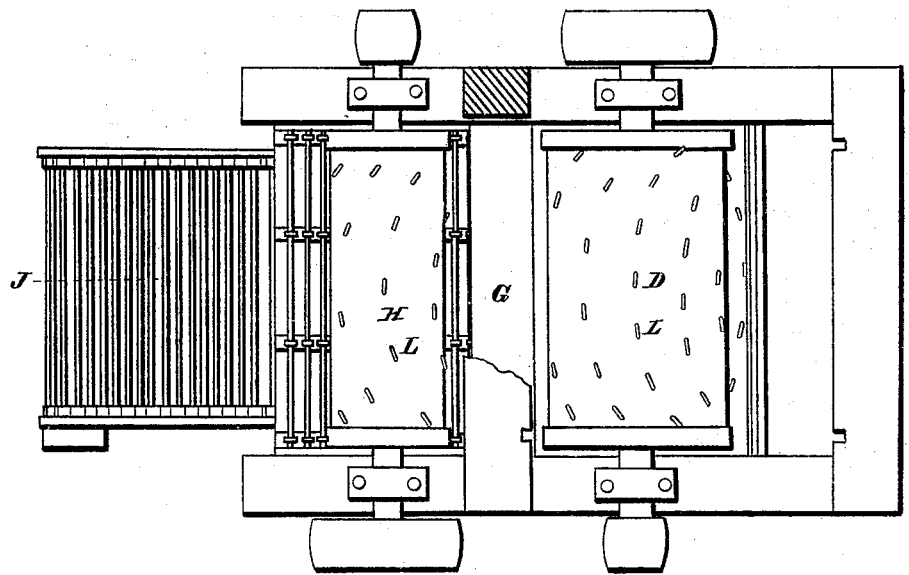

Figure 1 represents a vertical longitudinal section through the machine, and Fig. 2 represents a top view, with the hopper and cylinder covers removed.

Similar letters in both the figures denote the same parts.

No entirely successful corn sheller has heretofore been essayed, for shelling corn, when the ears of corn are fed to the machine in bulk, from the fact that one single large ear of corn will so force down the concave, as to prevent it from bringing the smaller ears in contact with the shelling cylinder, and consequently the small ears pass through untouched. To remedy this evil, the practice heretofore has been, to assort by hand, the ears, making two sizes, each fed in separately—the concave being set for each size, and thus making several operations. I speak exclusively of machines which are fed with the ears, in bulk, being aware that, in the other kinds of machines, where single ears are fed in at a time, suitable provision has been made for bringing each ear, large and small, in contact with the shelling wheel. But these latter machines are limited in their operation, to less than one fourth of the product of mine, in a given time.

The nature of my invention therefore consists in reducing the larger of the ears of corn to be shelled, to something like uniformity of size with the smaller ones, by passing the whole, first, through between a toothed cylinder and concave, where the large ears are caught, and partially operated on, preparatory to their passing with the smaller ones through between a second cylinder and concave, where the entire operation of shelling and separating takes place.

To enable others skilled in the art to make and use my invention, I will proceed to describe the same with reference to the drawings.

On top of a substantial frame, I arrange the hopper A, having an inclined bottom B, a portion C, of which is hinged, for regulating the feed, the corn being thrown into the hopper in bulk. Underneath the hinged portion C, is a guide board, for directing the ears properly in between the cylinder D, and concave E, the concave resting upon a spring F, for allowing it to yield to the larger ears, yet keep them with sufficient pressure up against the cylinder. The cylinder D, and concave F, are so adjusted as to only catch the larger of the ears, and even these may not be entirely divested of their grains, but are reduced somewhat in size, and the grains remaining upon them, are so loosened by this operation, as to be easily removed by the next operation which immediately follows, or which may more properly be termed the after part of the same operation. From the concave F, a curved board G, carries over the mass into the shelling cylinder H, with its concave I, where the operation is completed, and the corn separated from the cobs, by passing through between the slats or ribs of which the concave is formed, while the cobs are thrown out and carried away by the endless apron J. A spring K, is arranged for holding the concave I, to its cylinder H. The concave F, may be made with a tight bottom. The teeth L, of the cylinder and concave—one or both, are made of cast or wrought iron of a staple-shaped or ∩ form, open in the center so as to contract as little as possible the space between the cylinder and concave, and allow the grains to pass through without breaking, while they present a uniformly smooth surface to the ears—effectually knocking off the grains from the cob, without cutting or cracking them.

Although my machine has the appearance of a mere duplication of what might possibly be considered, as well known devices, such in face is not the same, for neither of the portions of the machine taken separately will perform the work, and consequently a duplication of such portions, cannot change the result. The first part of the machine prepares the ears for the second part, where the operation is completed. The second part by itself will not operate, because one large ear in passing through would prevent the concave and cylinder from touching the smaller ears. The first part performs mechanically, what has heretofore been done by hand, namely, bringing the ears to something like uniformity of size (this by hand making two sizes) so that one operation shall complete the shelling and separating. Neither taken separately will produce any good result. Both together perform the work effectually. The first part is a mere preparatory process. The second part completes what has been previously prepared for it, and which it cannot prepare for itself. The machine therefore is a unit, and cannot be considered as two machines or a duplication of one machine.

The power required to drive my machine is no greater, if as great, as that required where a single cylinder and concave is used, because in the latter case, the concave must press hard enough against the cylinder, or vice versa, to actually crush the large ears so that the smaller ones may be reached. No such pressure is required in mine. I remove the grains from the cobs, without breaking them in the least.

Having thus fully described the nature of my invention, what I claim therein as new and desire to secure by Letters Patent, is—

Reducing the larger of the ears of corn to be shelled, to a nearly uniform size with the smaller ones, by passing the whole through between a toothed cylinder and concave, where the large ears are caught and partially reduced or operated upon, preparatory to their passing with the smaller ones through between a second cylinder and concave where the entire operation of shelling and separating takes place, the whole being performed substantially in the manner herein described.

E. L. MILLIS.

Witnesses:
J. ARMS,
A. B. STOUGHTON.